United States Patent [19]

Proctor et al.

[11] Patent Number: 4,905,223
[45] Date of Patent: Feb. 27, 1990

[54] WIDEBAND/MULTISLOT SWITCHING ARRANGEMENT

[75] Inventors: Richard J. Proctor; Thomas S. Maddern, both of Dorset, England

[73] Assignee: The Plessey Company plc, Ilford, England

[21] Appl. No.: 156,503

[22] Filed: Feb. 16, 1988

[30] Foreign Application Priority Data

Feb. 17, 1987 [GB] United Kingdom ............... 8703649

[51] Int. Cl.$^4$ ........................................... H04Q 11/04
[52] U.S. Cl. ................................................... 370/58.2
[58] Field of Search ............... 370/58, 67, 110.1, 85, 370/68.1; 340/825.5, 825.79, 825.8; 379/93, 94

[56] References Cited

U.S. PATENT DOCUMENTS

| 4,530,093 | 7/1985 | Akram et al. ................. 370/85 |
| 4,577,312 | 3/1986 | Nash . | |
| 4,631,534 | 12/1986 | Franklin et al. ............ 370/85 |
| 4,759,017 | 7/1988 | Allan et al. .................. 370/84 |

FOREIGN PATENT DOCUMENTS

DE331043  9/1984  Fed. Rep. of Germany .
2301136   9/1976  France .
1001903   8/1985  United Kingdom .

OTHER PUBLICATIONS

M. T. Hills "Communication Principles in Power Communication" Moscow Radio and Communication 1984.

Primary Examiner—Joseph A. Orsino
Assistant Examiner—Frank M. Scutch, III
Attorney, Agent, or Firm—Fleit, Jacobson, Cohn, Price, Holman & Stern

[57] ABSTRACT

A wideband/multislot switching arrangement is provided for use in a digital telecommunications exchange. A call handling device is provided which receives signalling information about a path connection, and which communicates with a switch interface to generate a single switch request. The switch interface includes a map record of each circuit connection controlled by the call handling device and generates multiple switch requests which are used to control a number of switches to make the path connections.

5 Claims, 2 Drawing Sheets

WIDEBAND/MULTISLOT SWITCHING ARRANGEMENT

BACKGROUND OF THE INVENTION

The present invention relates to a wideband multislot switching arrangement for use in a digital telecommunication exchange, such as a System X exchange.

A Wideband/Multislot call is one where a number of timeslots are switched together across a network to provide connections of a different bandwidth to that normally transmitted. Normally the switch connects 64 Kbit/s path, but this arrangement is applicable to any size or type of switch.

Where a wideband call is made it is important that all timeslots are switched to the same physical connection (PCM or equivalent) through the switch. For instance they must not be routed in different PCM connections even if the two PCM connections go to the same exchange. The paths must be switched with the same path delay.

This arrangement is applicable to any bandwidth up to the highest synchronous rate terminated by the switch.

Current ways of looking at the provision of wideband services are based on enhancements to inter exchange signalling and exchange to subscriber signalling, then having the exchange perform active searches for paths that would add up to the service required.

This method is complex and would involve considerable development to achieve. There are also major problems in network dimensioning and management, so that ordinary calls do not make the network impossible for wideband calls, by using a few timeslots in all PCM connections, and the converse problem of preventing a few wideband calls using up all the available bandwidth and preventing ordinary calls.

Accordingly an aim of the present invention is to provide a wideband/multislot switching arrangement which does not suffer from the above mentioned problems.

SUMMARY OF THE INVENTION

According to the present invention there is provided a wideband/multislot switching arrangement, for use in a digital telecommunication exchange, wherein a call handling device is provided which receives signalling information about a path connection, and which communicates with a switch interface to generate a single switch request, the switch interface includes a map record of each circuit connection controlled by the call handling device and generates multiple switch requests which are used to control a number of switches to make the path connections.

BRIEF DESCRIPTION OF THE DRAWING

An embodiment of the present invention will now be described with reference to the following drawings in which.

DETAILED DESCRIPTION OF THE PREFERRED EMBODIMENT

Figure 1:
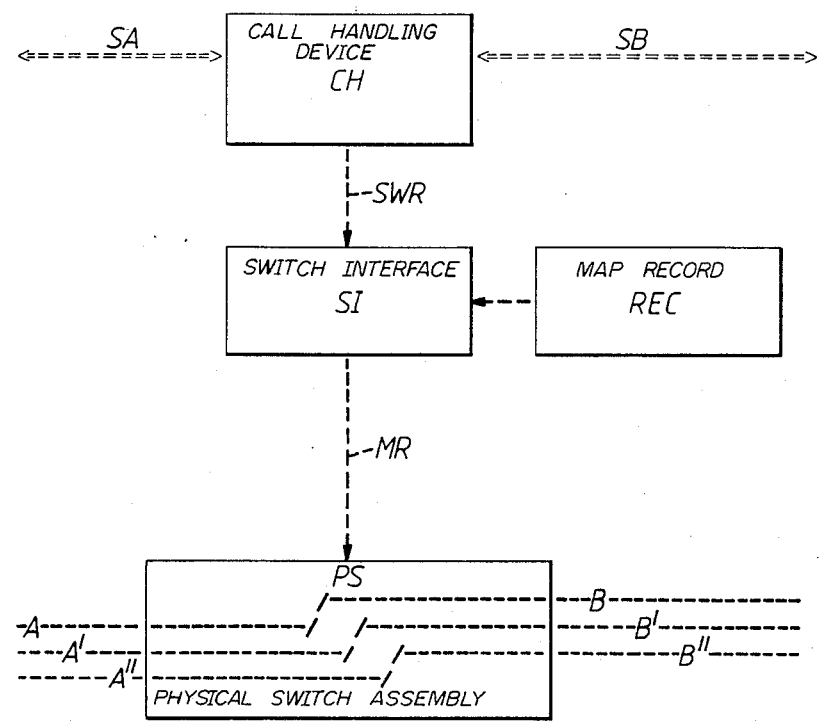
FIG. 1, shows a block diagram of a wideband/multislot switching arrangement.

Referring to FIG. 1, a conventional call handling device CH is used to handle calls, route them across the network and give switching instructions to the digital switch. The handling device CH normally connects the A side with the B side, and receives signalling information, SA, SB about the connection. The interface to the switch is at the software level, it does not directly control the hardware.

The call handling device is a standard element of a stored program controlled, SPC telephone exchange. It receives signalling from a variety of sources relating to telephone calls, it then uses the dialled digits to determine the routing of the call. The call handling device may have several points of entry for the digits, such that the same set of digits has different meaning from a subscriber than that from the network. The call handling device determines either an individual circuit/subscriber for the call or a route consisting of many circuits of which it will select a free circuit.

The call handling device determines the need to switch paths, and to do this it will identify a path that it requires to be connected by identifying the two ends.

The switch primatives that it gives the switch handler are:

a. Allocate—Setup a path used for all calls
b. Clear AB—Clear a path used for all calls
c. Clear All—Clear all connections to a given circuit, only used under fault conditions.
d. Trace—Request other end of a path from a given point, mainly used under fault conditions.
e. Change Transmission—Change trnsmission direction, used for some calls.

The switch interface SI holds a record REC for each circuit as known by the call handling device CH, indicating the type of service on the circuit, such as ordinary (1 timeslot), 6 timeslots etc, and any appropriate mapping to the switch(es) under its control. The switch then translates the single switching request SWR from the call handling (such as connect a path A to B or clear a path) into a number of multiple switching primitive requests MR to connect the appropriate paths by way of a physical switch assembly PS for the service, A to B, A' to B', A" to B" etc, while maintaining timeslot integrity. The record REC is in the form of a map for each circuit, A to A, A' to A" etc and B to B, B' to B" etc.

Seperate points of entry into the digit decodes are used for each wideband service supported. This means that for each level only those circuits that can carry the same level of service are addressable from the point of entry.

All the tables used by the switch relating to the wideband service are man-machine interface, MMI updatable to give flexibility in definition of the wideband connections.

The switch is enhanced so that the existing standard switch request interface from the call handling function will switch wideband paths as well as 64 Kbit/s paths. The call handling will not be aware that it is switching a wideband path.

The indication that the path is a wideband path, together with the full identities of all the timeslots at each end will be derived from data held within the switch.

The call handling device CH only uses one circuit (usually the first), for all operations, both internally when processing the call, and externally when signalling or when communicating with the switch interface.

The allocation of the wideband service to particular PCM connections is set by a service mark.

This can be offered to customers for ordinary switched services as well as for Private Circuits, and Virtual Private Networks.

The new development for this is the mapping from the call handling circuit to the switching circuit(s). Otherwise it is a reuse of existing facilities in a new combination.

Data

There are four data areas required to hold the data, the first is changed frequently in the provisioning of wideband services. The other three will only be changed when establishing new service layers.

The selection of the type of service required is through the Circuit Service Layer (CSL) which exists for each circuit on the switch and identifies the service layers. Once a wideband path has been identified the selection of the actual timeslots is made using the other three data areas, these are the bandwidth, an index into the timeslot data, and the timeslot data itself.

It is possible for more than one service layer to have the same bandwidth.

Circuit Service Layer (CSL)

This data area holds the service layer for each circuit on the switch.

This data is indexed by the PCM number and the PCM Channel number to give the service layer. Service layer 0 is reserved for the 64 Kbit/s service, other service layers may be defined in a number of different ways, with higher bandwidths.

Service Layer Bandwidth (SLB)

This data area holds the number of 64 Kbit/s channels available on a circuit at each service layer.

The rest of the data that follows is for services of up to 2 M bit/s. For higher order connections different data would be needed, that operates on whole PCMs rather than channels. This could also imply access to other switches if required.

Service Layer Index (SLI)

This data area allows flexibility in establishing the definition of service layers. This is a two dimensional array of index's into the service layer data.

This is indexed by the service layer and the identified channel. The data identifies the first entry in the service layer data to identify the actual timeslots for the path. The N timeslots will be in N consecutive entries starting at that identified in this index.

Service Layer Data (SLD)

This data area allows flexibility in establishing the definitions of service layers, this identifies the actual channels in each service layer. The channels should be in order, the reason the data is set up this way is to streamline the access to this data for switch requests.

When sorting out switch requests for a service of N timeslots, N consequitive entries in this data will be accessed starting at the one given by the starting index.

N entries of this data are required for each addressable circuit on each service layer. For example 5 sets of 6 entries will be needed for the 6 timeslot (384 Kbit/s) service. 30 will be required for a 30 timeslot service and 31 for a 31 timeslot service.

Figure 2:
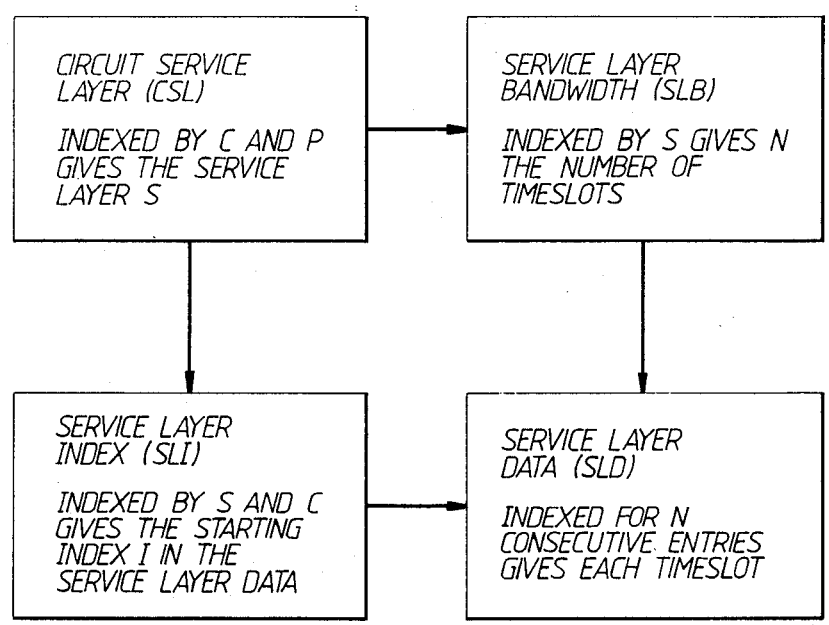
FIG. 2 shows an example of data linking.

An example of data linking is shown with reference to FIG. 2.

FIG. 2 shows how the data is accessed to obtain the timeslots for a service. To setup a path will need data access to be performed for each end of the path and then corresponding timeslots from the SLD data will be connected.

For a circuit for channel C on PCM P, Service Layer S is found, which has N timeslots. The index into the data is I.

Behaviour of Switch requests

When the switch interface receives a switch request from the call handling device it examines the service layer bandwidth about each end of the path, the action taken will depend on the service layer. If the service layer is zero for the 64 Kbit/s service then the conventional switch request actions will be taken.

If the ends have different bandwidths then a failure should be reported. Alternatively the system could use the smallest common bandwidth of the two ends.

If both ends have the same service layer bandwidth then the following actions are performed for the switch request primitives.

In general the response to the call handling should reflect the most onerous of the responses from the switch hardware, in the case of a partial setup, the incomplete call should be removed from the switch.

Allocate AB

This switch primative is to establish a path between the two points A and B, it may request transmission in one direction only.

The switch interface determines the timeslots on each end of the path, using the data areas explained above and then setup the appropriate switch paths on the switch, by connecting corresponding pairs of channels identified by the N entries for the bandwidth, the channel numbers will be obtained from the SLD data. These paths must be established with timeslot integrity.

The determination of the timeslots depends on the data described previously. The data will need to be interrogated twice to obtain the timeslot identities of each end of the path.

If any of the paths fail to be established then the reply to the user must reflect the failure.

Clear AB

This switch primative is to clear an identified path from A to B. The bandwidth and channel data for the two ends is obtained in the same way as for the allocate.

The switch interface determines the timeslots for each of the paths across the switch and clear all the relevant paths down, by issuing clears to the switch for each of the N paths, obtaining the channel identity for each clear from the SLD data.

Clear All

This switch primative is to clear all the connections to a point on the switch. In this case only one end of the path(s) is given.

The switch interface determines all the timeslots for the given end, and clear all connections to each of these.

Trace A

This switch primative is to trace a path given one end, in the case of multiple paths from that point one request is required for each of the paths.

The switch interface finds the bandwidth of the end, then issues a single trace to the switch hardware, this gives the first path across the switch, the other end of which can be given as the result of the trace. However if the trace is being relied upon as giving a hardware check of a path, then an explicit trace should be given for each of the other paths across the switch.

If any of the timeslots is faulty or not set up, then the reply to the call handling device will reflect this.

Change Transmission Direction

This is to change the transmission of a path, from one way to two ways, or to reverse a one way path, or reduce two way transmission to only one way.

The switch interface treats this in a very similar manner to the allocate.

The basic service as described above can be extended to offer improved services as described below.

Subscriber Control of Bandwidth

This allows subscribers to control the service marks indicating the service layers they wish to use. This is similar to the control of other supplementary services and will increase the flexibility of access.

For example the subscriber could on demand change from say six individual circuits to one circuit of six timeslots.

There are limitations to the flexibility depending on the service layers handled on the exchange.

Separate Switches

Seperate switches could be controlled instead of one switch, and would not affect the call processing, only the switch interface. This could be used to control large seperate switches capable of switching 140 Mbit/s links for example.

Unidirectional paths

By having additional service layers for unidirectional services at each bandwidth, services can be offered where the caller only has a path to the called party or from the called party.

Subscribers can then have assymetric communication by making two seperate calls for forward and reverse paths using different bandwidths. This would not effect the call handling.

The invention, when used in conjunction with a System X exchange for example offers a powerful wideband/multislot service for a small amount of change with no impact on network signalling.

The above description is not intended to limit the scope of the invention, for example extensions can be added to provide a dial up service with bandwidth on demand.

The invention may be used with other types of switch, and need not be restricted to conventional digital switches.

The above represents one way to perform the invention. It only covers the connections up to 2 Mbit/s using the same switch, for high order connections additional data is required, to operate on whole PCMs. Additionally if this method is extended to drive multiple switches the data will need to be extended to hold this information.

We claim:

1. A wideband/multislot switching arrangement, for use in a digital telecommunications exchange including a call handling device controlling circuit connections of a physical switch assembly and a switch interface in communication with the call handling device, the switch interface includes means for storing a map record of each of the circuit connections controlled by the call handling device and available services at the respective circuit connections, said call handling device including means for receiving signalling information about paths established by said circuit connections and means generating a single switch request presented to the switch interface for addressing the map record storing means and rendering the switch interface operative to generate multiple switch requests to control the physical switch assembly in establishing the paths.

2. A wideband/multislot switching arrangement as claimed in claim 1, wherein said map record storing means stores data relating to the available services and service layers and selecting one of the available services required.

3. A wideband/multislot switching arrangement as claimed in claim 2, wherein said map record storing means further stores data relating to service layer bandwidth representing the number of 64 Kbit/s to 2 Mbit/s channels available at each of the service layers.

4. A wideband/multislot switching arrangement as claimed in claim 2, wherein said map recording storing means further stores data relating to a service layer index identifying a first entry of the service layer data and identify actual timeslots for the established paths.

5. A wideband/multislot switching arrangement as claimed in claim 4, wherein the data relating to the service layers identifies actual channels in each of the service layers.

* * * * *